United States Patent
Sambhwani et al.

(10) Patent No.: US 8,477,603 B2
(45) Date of Patent: Jul. 2, 2013

(54) LOAD CONTROL IN UPLINK INTERFERENCE CANCELLATION SYSTEMS WITH SOFT DECISION

(75) Inventors: Sharad Deepak Sambhwani, San Diego, CA (US); Wei Zeng, San Deigo, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/087,148

(22) Filed: Apr. 14, 2011

(65) Prior Publication Data

US 2011/0255432 A1    Oct. 20, 2011

Related U.S. Application Data

(60) Provisional application No. 61/324,700, filed on Apr. 15, 2010.

(51) Int. Cl.
*H04L 12/26* (2006.01)

(52) U.S. Cl.
USPC .......................................... 370/229; 370/252

(58) Field of Classification Search
USPC .................. 370/229–235, 252, 253; 455/63.1
See application file for complete search history.

(56) References Cited

U.S. PATENT DOCUMENTS

| 7,443,829 | B2 | 10/2008 | Rizvi et al. | |
| 8,358,610 | B2 * | 1/2013 | Luo et al. | 370/317 |
| 2003/0091102 | A1 | 5/2003 | Oates | |
| 2006/0050662 | A1 * | 3/2006 | Rizvi et al. | 370/320 |
| 2006/0105774 | A1 | 5/2006 | Ranta-Aho et al. | |
| 2008/0279121 | A1 | 11/2008 | Englund et al. | |
| 2009/0088080 | A1 | 4/2009 | Zhang et al. | |
| 2010/0080323 | A1 | 4/2010 | Mueck et al. | |
| 2010/0120446 | A1 | 5/2010 | Gaal | |

FOREIGN PATENT DOCUMENTS

| EP | 2159926 A1 | 3/2010 |
| WO | 0038348 A1 | 6/2000 |
| WO | 2007086005 A2 | 8/2007 |
| WO | 2009/060303 | 5/2009 |

OTHER PUBLICATIONS

Benq: "Modeling of Signal Correlation for Dual-Branch Interference Cancellation", 3GPP Draft; R4-060219, 3rd Generation Partnership Project (3GPP), Mobile Competence Centre ; 650, Route Des Lucioles ; F-06921 Sophia-Antipolis Cedex ; France, vol. RAN WG4, no. Denver, USA; 20060210, Feb. 10, 2006, XP050175290, [retrieved on Feb. 10, 2006] abstract.
International Search Report and Written Opinion—PCT/US2011/032772—ISA/EPO—Oct. 7, 2011.

* cited by examiner

*Primary Examiner* — Gary Mui
(74) *Attorney, Agent, or Firm* — Darren M. Simon

(57) ABSTRACT

A method for load control in uplink interference cancellation systems with soft decision is disclosed. It is determined whether interference is to be cancelled from a received signal based on a packet size of the received signal. If the signal is to be cancelled, a maximal correlation factor between an interfering portion and a useful portion of the received signal is determined based on a transport block size of the received signal. If the signal is to be cancelled, a reduced target load for a base station is also determined based on the maximal correlation factor. If the signal is to be cancelled, uplink transmit power for one or more wireless communication devices is adjusted based on the reduced target load.

15 Claims, 9 Drawing Sheets

LOAD CONTROL IN UPLINK INTERFERENCE CANCELLATION SYSTEMS WITH SOFT DECISION

RELATED APPLICATIONS

This application is related to and claims priority from U.S. Provisional Patent Application Ser. No. 61/324,700 filed Apr. 15, 2010, for "Load Control in Uplink Interference Cancellation with Soft Decision."

TECHNICAL FIELD

The present disclosure relates generally to communication systems. More specifically, the present disclosure relates load control in uplink interference cancellation systems with soft decision.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

Wireless communication systems are widely deployed to provide various types of communication content such as voice, video, data and so on. These systems may be multiple-access systems capable of supporting simultaneous communication of multiple wireless communication devices with one or more base stations.

Because multiple devices may communicate wirelessly in the same geographic area, the signals may be corrupted during transmission. Therefore, wireless devices may use a variety of signal processing techniques to recover the intended data. For example, a base station or mobile device may cancel interference from unwanted signals. However, interference cancellation may have unintended consequences for useful signals. Therefore, benefits may be realized by systems and methods for load control in uplink interference cancellation systems with soft decision.

SUMMARY OF THE INVENTION

A method for load control in uplink interference cancellation systems with soft decision is disclosed. It is determined whether interference is to be cancelled from a received signal based on a packet size of the received signal. If the signal is to be cancelled, a maximal correlation factor between an interfering portion and a useful portion of the received signal is determined based on a transport block size of the received signal. If the signal is to be cancelled, a reduced target load for a base station is also determined based on the maximal correlation factor. If the signal is to be cancelled, uplink transmit power for one or more wireless communication devices is adjusted based on the reduced target load.

The maximal correlation factor may be the highest correlation factor determined for the transport block size and a plurality of channel types. The maximal correlation factor may also depend on a Walsh structure of an interfering wireless communication device and not a Walsh structure of non-interfering wireless communication devices. A table that is calculated before the method is performed may be used to determine the maximal correlation factor.

To determine the reduced target load, a reduced target energy for the base station may be determined based on the maximal correlation factor. A reduced target Rise over Thermal (RoT) may also be determined based on the target energy. A reduced target load may be determined based on the reduced target RoT. The reduced target energy for the base station may be determined by multiplying a total received energy ($I_0$) by $(1-\alpha)^2$, where $\alpha$ is the maximal correlation factor.

Uplink transmit power may also be sent to wireless communication devices. The method may be performed by a Node B.

A base station for load control in uplink interference cancellation systems with soft decision is also disclosed. The base station includes a processor and memory in electronic communication with the processor. Executable instructions are stored in the memory. The instructions are executable to determine whether interference is to be cancelled from a received signal based on a packet size of the received signal. The instructions are also executable, if the signal is to be cancelled, to determine a maximal correlation factor between an interfering portion and a useful portion of the received signal based on a transport block size of the received signal. The instructions are also executable, if the signal is to be cancelled, to determine a reduced target load for the base station based on the maximal correlation factor. The instructions are also executable, if the signal is to be cancelled, to adjust uplink transmit power for one or more wireless communication devices based on the reduced target load.

A base station for load control in uplink interference cancellation systems with soft decision is also disclosed. The base station includes means for determining whether interference is to be cancelled from a received signal based on a packet size of the received signal. The base station also includes means for determining, if the signal is to be cancelled, a maximal correlation factor between an interfering portion and a useful portion of the received signal based on a transport block size of the received signal. The base station also includes means for determining, if the signal is to be cancelled, a reduced target load for the base station based on the maximal correlation factor. The base station also includes means for adjusting, if the signal is to be cancelled, uplink transmit power for one or more wireless communication devices based on the reduced target load.

A computer-program product for load control in uplink interference cancellation systems with soft decision is also disclosed. The computer-program product comprises a non-transitory computer-readable medium having instructions thereon. The instructions include code for causing a base station to determine whether interference is to be cancelled from a received signal based on a packet size of the received signal. The instructions also include code for causing the base station to determine, if the signal is to be cancelled, a maximal correlation factor between an interfering portion and a useful portion of the received signal based on a transport block size of the received signal. The instructions also include code for causing the base station to determine, if the signal is to be cancelled, a reduced target load for the base station based on the maximal correlation factor. The instructions also include code for causing the base station to adjust, if the signal is to be cancelled, uplink transmit power for one or more wireless communication devices based on the reduced target load.

A method for load control in uplink interference cancellation systems with soft decision is also disclosed. Data that indicates power headroom information for one or more wireless communication devices is received at a base station. A wireless communication device that is headroom limited is identified based on the data. A reduced target load that achieves a target block error rate (BLER) is determined for the wireless communication device. Uplink transmit power is adjusted for one or more of the wireless communication devices based on the reduced target load.

When determining the reduced target load, the target load may be reduced if a packet from the wireless communication device is not decoded correctly. Alternatively, the target load may be increased if the packet from the wireless communication device is decoded correctly. Cyclic redundancy check (CRC) results may be used to determine if the packet from the wireless communication device is decoded correctly. Uplink transmit power may be sent to the wireless communication devices. The method may be performed by a Node B.

A base station for load control in uplink interference cancellation systems with soft decision is also disclosed. The base station includes a processor and memory in electronic communication with the processor. Executable instructions are stored in the memory. The instructions are executable to receive data at a base station that indicates power headroom information for one or more wireless communication devices. The instructions are also executable to identify a wireless communication device that is headroom limited based on the data. The instructions are also executable to determine a reduced target load to achieve a target block error rate (BLER) for the wireless communication device. The instructions are also executable to adjust uplink transmit power for one or more of the wireless communication devices based on the reduced target load.

A base station for load control in uplink interference cancellation systems with soft decision is also disclosed. The base station includes means for receiving data at a base station that indicates power headroom information for one or more wireless communication devices. The base station also includes means for identifying a wireless communication device that is headroom limited based on the data. The base station also includes means for determining a reduced target load to achieve a target block error rate (BLER) for the wireless communication device. The base station also includes means for adjusting uplink transmit power for one or more of the wireless communication devices based on the reduced target load.

A computer-program product for load control in uplink interference cancellation systems with soft decision is also disclosed. The computer-program product comprises a non-transitory computer-readable medium having instructions thereon. The instructions include code for causing a base station to receive data at a base station that indicates power headroom information for one or more wireless communication devices. The instructions also include code for causing a base station to identify a wireless communication device that is headroom limited based on the data. The instructions also include code for causing a base station to determine a reduced target load to achieve a target block error rate (BLER) for the wireless communication device. The instructions also include code for causing a base station to adjust uplink transmit power for one or more of the wireless communication devices based on the reduced target load.

DETAILED DESCRIPTION

Figure 1:
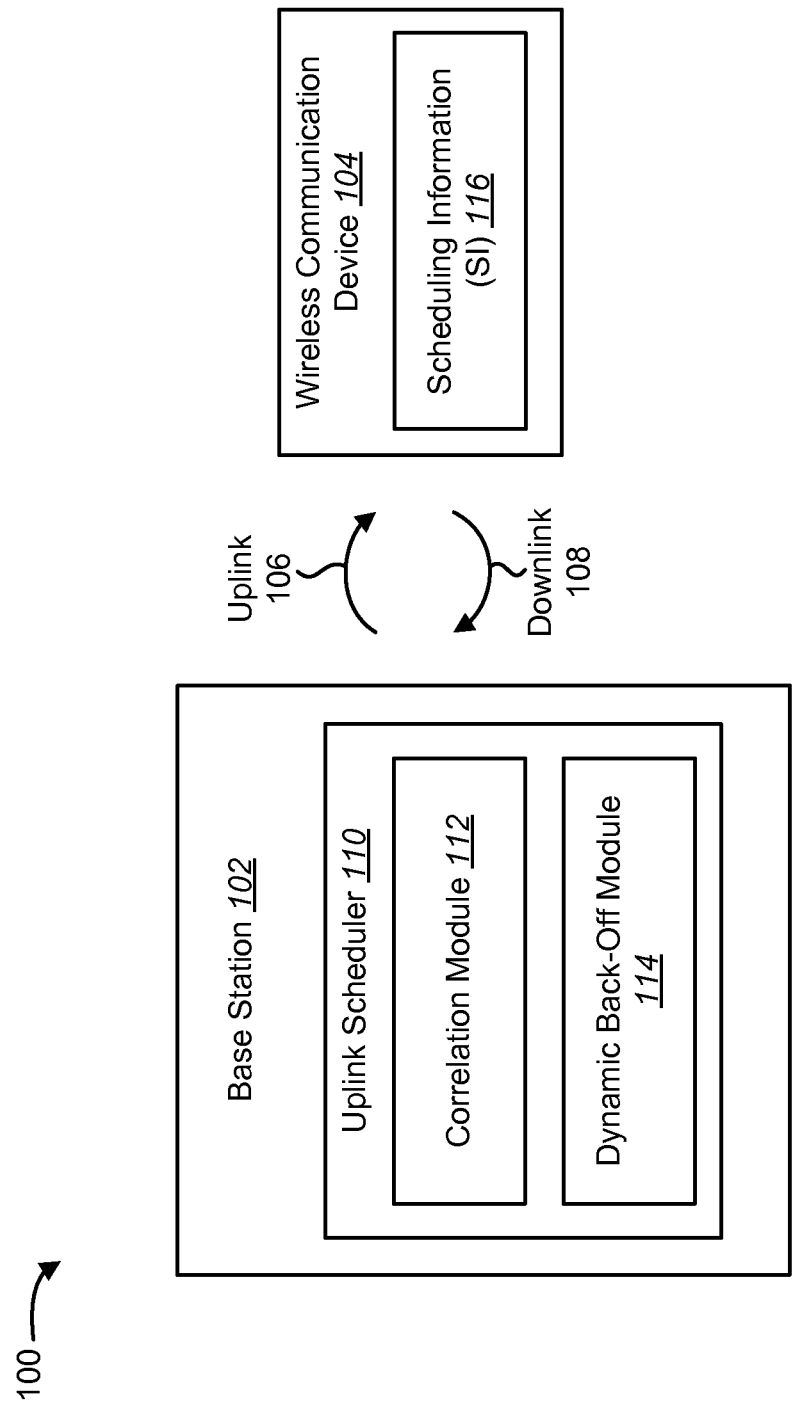
FIG. 1 is a block diagram illustrating a wireless communication system with a base station and one or more wireless communication devices.

Interference cancellation may be performed on uplink signals in wireless communication signals. One possible method of interference cancellation is performed before decoding. However, pre-decoding interference cancellation may cause an unwanted side effect. Specifically, a portion of the useful signal may be cancelled when the interference is cancelled. Therefore, the present systems and methods may reduce this side effect, using the scheduler, by adjusting the target RoT and, thus, the target load. In other words, the present systems and methods schedule uplink data to compensate for a correlation phenomenon present in certain interference cancellation techniques. Without compensating for this correlation, the side effect of interference cancellation may have negative consequences for cell edge users (i.e., those transmitting at highest power) because some of the cell edge user's useful signal is reduced, which may prevent the user from closing its communication link, i.e., correctly decoding messages. This may effectively reduce cell coverage.

When scheduling, a base station may attempt to maintain a constant Rise over Thermal (RoT), i.e., the total received uplink signal divided by the total uplink thermal noise. Systems using interference cancellation, however, may allow a slightly higher target RoT in anticipation of subsequent interference cancellation. In other words, the target RoT may be raised because the total thermal noise may be reduced, allowing the base station to achieve a higher RoT. If the base station cancels a large portion of the present noise/interference, the base station may raise the target RoT more than if the base station cancels a small portion of the noise/interference.

In contrast to this configuration, however, the present systems and methods may adjust the target RoT not only by how much interference the base station can cancel, but also by how much of the useful signal is likely to be cancelled during interference cancellation. For example, suppose user A is the interfering signal and user B is the useful signal. By removing user A's signal, the base station may also cancel some of user B's signal, i.e., there is a correlation between the amount of the interfering signal cancelled and the amount of the useful signal cancelled. As described herein, this correlation depends on user A's Walsh structure and user A's physical channel type. User A's packet size (e.g., transmit block size (TBS)) may be used instead of the Walsh structure to determine a correlation factor because the base station may be unaware of user A's Walsh structure. User A's exact channel type may also be unknown to the base station. Instead, the base station may use a worst case channel to determine the correlation factor. Therefore, in one configuration, a base station may use the interfering user's transmit block size to determine a correlation factor between the amount of interfering signal cancelled and the amount of useful signal cancelled. The correlation factor may then be used by the uplink scheduler in the base station to determine a target RoT and uplink transmit power for the mobile devices from the target RoT.

FIG. 1 is a block diagram illustrating a wireless communication system 100 with a base station 102 and one or more wireless communication devices 104. For example, the base station 102 may be a Node B and the wireless communication device 104 may be a User Equipment (UE). The base station 102 may receive data from the wireless communication device 104 on the uplink 106 and transmit data to the wireless communication device 104 on the downlink 108. The base station 102 may use uplink interference cancellation with soft decision. As used herein, the term "soft" refers to data that has a real number value instead of only binary data in hard data. In other words, soft data indicates the value and reliability of the data.

As used herein, the term "wireless communication device" 104 refers to an electronic device that may be used for voice and/or data communication over a wireless communication system 100. Examples of wireless communication devices 104 include cellular phones, personal digital assistants (PDAs), handheld devices, wireless modems, laptop computers, personal computers, etc. A wireless communication device 104 may alternatively be referred to as an access terminal, a mobile terminal, a mobile station, a remote station, a user terminal, a terminal, a subscriber unit, a mobile device, a wireless device, a user equipment (UE), a subscriber station or some other similar terminology.

The term "base station" 102 refers to a wireless communication station that is installed at a fixed location and used to communicate with wireless communication devices 104. A base station 102 may alternatively be referred to as an access point, a Node B, an evolved Node B or some other similar terminology.

The base station 102 may include an uplink scheduler 110. The uplink scheduler 110 may be responsible for allocating resources to wireless communication devices 104 for which it acts as the serving base station 102, i.e., a serving base station 102 may specify which wireless communication devices 104 transmit on the uplink 106 and how much data is transmitted on the uplink 106. The scheduler 110 may use one or more target load metrics to schedule data on the uplink 106. For example, one technique that may be used to adjust the load of a network monitors a Rise over Thermal (RoT). The RoT is a ratio between the total power in the uplink 106 and the thermal noise power in the uplink 106. Adjusting the transmission power of wireless communication devices 104 to achieve a target RoT is one way to balance the network load, and thereby optimize the performance of the network. Furthermore, wireless communication devices may accumulate and send scheduling information (SI) 116 on the uplink 106. The scheduling information (SI) 116 may indicate the headroom (i.e., how much additional transmit power is available for the wireless communication device 104) and the amount of data for transmission. The base station 102 may use the scheduling information (SI) 116 to efficiently allocate resources. For example, if a wireless communication device 104 has a large amount of headroom and desires to transmit a large amount of data, the base station 102 may allow the wireless communication device 104 to increase power on its uplink 106 transmissions. On the other hand, if a wireless communication device 104 has little headroom or little data to transmit, the base station 102 may not increase the uplink 106 transmit power for the wireless communication device 104.

Interference cancellation (IC) may be used in wireless communication systems 100 to improve wireless signals by reducing unwanted interfering signals. One possible way to cancel uplink interference is for the base station 102 to cancel interference in the uplink 106 signal after successful decoding of packets. Alternatively, interference cancellation may be attempted before packet decoding, using a demodulated signal, i.e., pre-decoding IC. In pre-decoding IC, the reconstructed signal may be correlated with other users' signals. Therefore, other users' signals may be impaired and signal-to-noise ratio (SNR) may be changed after the interference cancellation. In other words, pre-decoding IC may cancel interference and, unintentionally, a portion of the useful signal. This phenomenon may lead to impact on cell coverage, depending on the implementation of the uplink scheduler 110, e.g., a Medium Access Control-e (MAC-e) scheduler. For example, if the target RoT after cancellation is set to be the same as the target RoT of a non-IC system, then a cell-edge user in a soft-IC system may need a larger transmit power to achieve the same post-IC SINR as in a non-IC system. This may be equivalent to reduction in cell coverage.

The present systems and methods may address this consequence of pre-decoding, soft IC using the uplink scheduler 110. More specifically, the uplink scheduler 110 may account for this correlation effect due to interference cancellation during load control to avoid a reduction in cell coverage. Therefore, the uplink scheduler 110 may include a correlation module 112 and a dynamic back-off module 114. The correlation module 112 may use a correlation factor to account for the impairment of a useful signal from cancellation of an interfering signal. The correlation factor may be dependent on the signal being cancelled, and not directly on other wireless communication devices' signal strengths. Therefore, when a particular uplink 106 signal is reconstructed using pre-decoding, soft IC and cancelled, its impact to all other users is similar. Specifically, the correlation module 112 may perform load control by taking back-off from the target load of the base station 102 whenever a packet is scheduled for uplink 106 transmission by the uplink scheduler 110 and this packet will be cancelled. The back-off amount may only be used for uplink 106 data from which interference is going to be canceled since the correlation effect (between the interference and some of the useful signal) may not be present for data that will not have interference canceled. The back-off amount may be pre-determined based on spreading factor and channel types. After modifying the target load, the base station 102 may use a reduced target load for its scheduling.

Alternatively, the dynamic back-off module 114 may first identify a head-room limited cell-edge user (e.g., using received scheduling information (SI) 116), and dynamically adjust the cell target load based on the residual block error rate (BLER) of this particular user. The block error rate (BLER) is a metric indicating reliability of transmitted data and may be computed from acknowledgments (ACKs) and non-acknowledgments (NACKs) over a period of communication. Furthermore, the block error rate (BLER) may affect the throughput of the wireless communication system 100. In general, the block error rate (BLER) refers to the block error rate statistically averaged over sufficiently long periods of time and takes values between 0 and 1.

Figure 2:
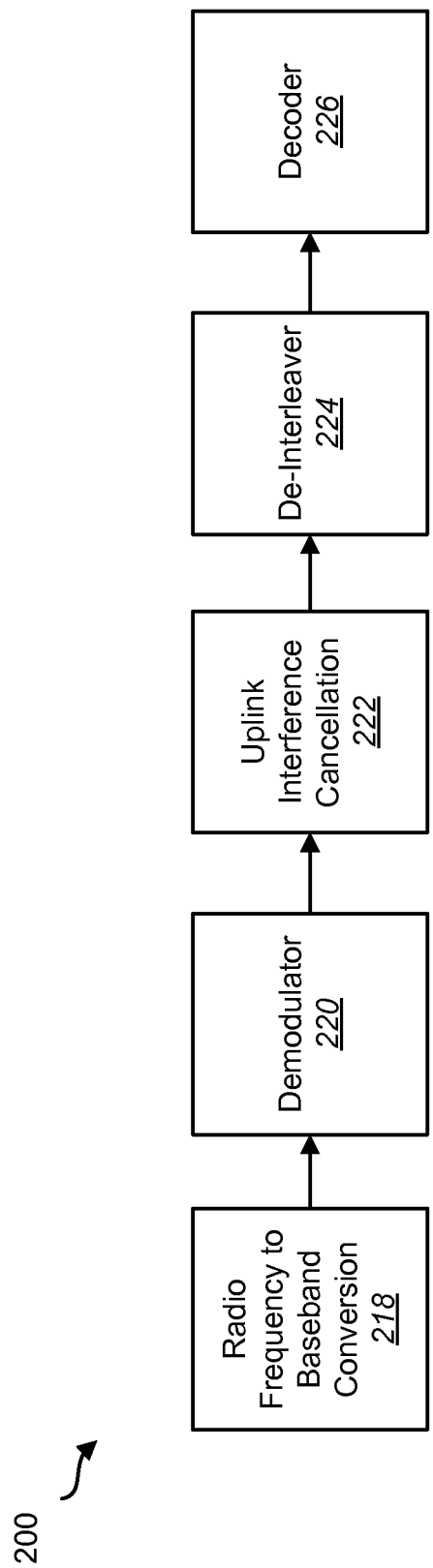
FIG. 2 is a block diagram illustrating a receive chain.

FIG. 2 is a block diagram illustrating a receive chain 200. For example, the receive chain may be in a base station 102. The receive chain 200 may include a radio frequency to baseband conversion module 218, e.g., a mixer. This may produce a baseband signal from a radio frequency (RF) signal. The baseband signal may be demodulated in a demodulator 220. The demodulator 220 may correspond to a modulator in a transmit chain (not shown) that sends the received signal, e.g., if a Quadrature Phase-Shift Keying (QPSK)

modulation is performed at a transmitter then QPSK demodulation may be performed at the demodulator 220.

In one configuration (not shown), the demodulated signal may be de-interleaved and decoded. Then, a decoded signal may be interference cancelled, i.e., post-decoding IC. Alternatively, in the configuration illustrated in FIG. 2, the demodulated signal may be interference cancelled before decoding, i.e., pre-decoding IC. However, as mentioned above, pre-decoding uplink interference cancellation 222 may reduce the SNR of a desired signal, which may have coverage implications. In other words, pre-decoding IC may cancel some of the useful signal in addition to interference. Therefore, the uplink scheduler 110 of the present systems and methods may account for this effect when performing load control. In pre-decoding IC, the interference cancelled signal may then be de-interleaved and decoded by the de-interleaver 224 and decoder 226, respectively.

Figure 3:
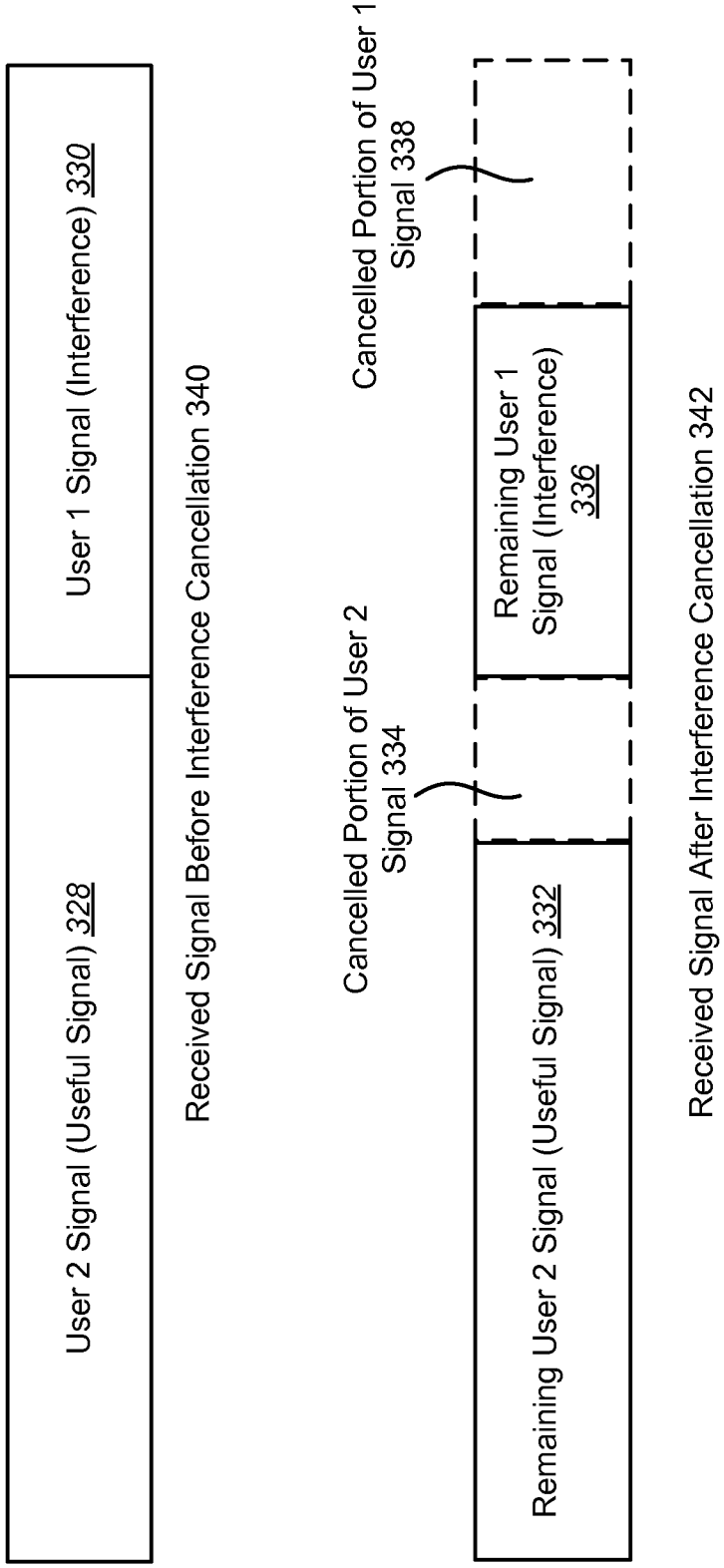
FIG. 3 is a block diagram illustrating the correlation phenomenon in pre-decoding uplink interference cancellation systems.

FIG. 3 is a block diagram illustrating the correlation phenomenon in pre-decoding uplink interference cancellation systems. The top of FIG. 3 illustrates a received uplink signal before interference cancellation 340. The signal 340 includes a useful signal 328 and interference 330. The useful signal 328 portion of the received signal 340 may be an uplink transmission from a second user (i.e., user 2) and the interference 330 portion of the received signal 340 may be from a first user (i.e., user 1). In other words, the first user's transmission may be acting as interference 330 when the base station is receiving the second user's transmission 328. When scheduling uplink data, the base station 102 may use the combined Rise over Thermal (RoT) experienced at the base station. For example, the base station 102 may combine the useful signals 328 received and divide it by the interference 330 and compare this value (i.e., the RoT) to a target RoT. Alternatively, the load itself may be used. In other words, the base station 102 may schedule uplink data in an effort to maintain a target RoT or target load measured by some other metric. In systems with pre-decoding interference cancellation, the base station 102 may raise the target RoT in anticipation cancellation of interference, i.e., if less interference is present, the RoT may be higher. However, pre-decoding interference cancellation may also cancel some of the useful signal 328, possibly leading to reduced cell coverage.

The bottom of FIG. 3 illustrates a received signal after interference cancellation 342, e.g., using pre-decoding IC. The post-IC signal 342 may include most of the useful signal (i.e., the remaining user 2 signal) 332 and some of the interference (i.e., remaining user 1 signal) 336. However, the post-IC signal 342 may have removed a cancelled portion of the user 2 signal 334 and a cancelled portion of the user 1 signal 338. The cancelled interference 338 may be intended. The cancelled useful signal 334 may be unintended. Furthermore, this unintended cancellation may mean that wireless communication devices 104 have to increase their uplink power to maintain their SNR at the base station 102. However, a cell-edge user may not have available headroom to increase its uplink power. Therefore, this cancellation of useful signal 334 at the base station 102 may cause user 2's SNR to drop below an acceptable level, i.e., the minimum SNR for reliable decoding. This may effectively reduce cell coverage, i.e., if cell-edge users cannot close their communication loops, the effective area of the cell is smaller.

Figure 4:
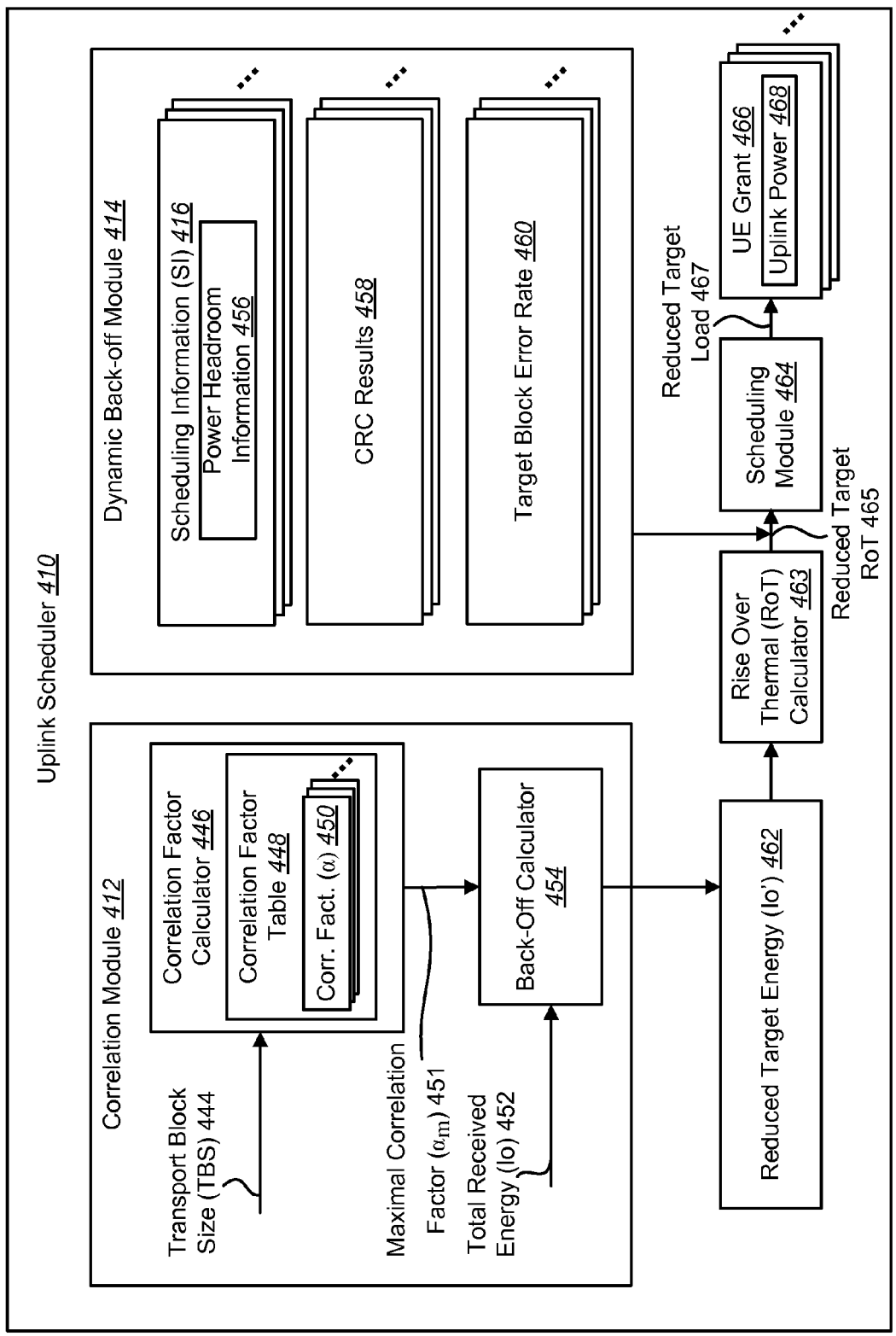
FIG. 4 is a block diagram of an uplink scheduler.

FIG. 4 is a block diagram of an uplink scheduler 410, e.g., in a base station 102. The uplink scheduler 410 may perform load control for a base station 102. Load control may utilize two buffers for every wireless communication device 104. A raw antenna buffer may include the unmodified data as it is received over the air. A modified antenna buffer may include data that is updated as the interference is cancelled from the received data. The term "load" may refer to a metric used to describe the amount of uplink traffic received by a base station. The "load" at a base station 102 may directly relate to the total RoT of all users in a system. The target load in a base station 102 may be used to determine uplink power for the wireless communication devices 104 served by the base station 102, i.e., the base station may determine uplink transmit power for the wireless communication devices 104 to achieve the target load at the base station 102. The uplink scheduler 410 may determine the target load for a raw antenna in a base station 102 according to Equation (1):

$$L_{curr,raw} + \Delta L_{i,raw} \leq L_{tar,raw} \quad (1)$$

where $L_{curr,raw}$ is the load of the current transmission of the raw antenna, $\Delta L_{i,raw}$ is the increment to the raw load for the next transmission, and $L_{tar,raw}$ is the target load for the raw antenna. Similarly, the load of the modified antenna may be limited by Equation (2):

$$L_{curr,mod} + \Delta L_{i,mod} \leq L_{tar,mod} \quad (2)$$

where $L_{curr,mod}$ is the load of the current transmission of the modified antenna, $\Delta L_{i,mod}$ is the increment to the current load for the next transmission, and $L_{tar,mod}$ is the target load for the modified antenna. The loads of the raw antenna and modified antenna may be different because some of the interference may be cancelled from the modified antenna, thus producing a different signal to noise ratio (SNR) and load.

The raw load increment, $\Delta L_{i,raw}$, may be given by Equation (3):

$$\Delta L_{i,raw} = \frac{1}{1 + \frac{E_{cp}}{N_t}\left(1 + \frac{T}{P}\right)curr} - \frac{1}{1 + \frac{E_{cp}}{N_t}\left(1 + \frac{T}{P}\right)post} \quad (3)$$

where $E_{cp}$ is the chip level pilot power, $N_t$ is the chip level total noise power of a particular user, T/P indicates the power ratio of traffic signal to pilot signal, the subscript "curr" indicates the current transmission, and the subscript "post" refers to post-scheduling.

Similarly, the modified load increment, $\Delta L_{i,mod}$, for non-IC users may be given by Equation (4):

$$\Delta L_{i,mod} = \frac{1}{1 + \left(\frac{E_{cp}}{N_t}\right)_{mod}\left(1 + \frac{T}{P}\right)curr} - \frac{1}{1 + \left(\frac{E_{cp}}{N_t}\right)_{mod}\left(1 + \frac{T}{P}\right)post} \quad (4)$$

and the modified load increment, $\Delta L_{i,mod}$, with interference cancellation may be given by Equation (5):

$$\Delta L_{i,mod} = \frac{1}{1 + \left(\frac{E_{cp}}{N_t}\right)_{mod}\left(1 + \frac{T}{P}\right)curr(1-\beta)} - \frac{1}{1 + \left(\frac{E_{cp}}{N_t}\right)_{mod}\left(1 + \frac{T}{P}\right)post(1-\beta)} \quad (5)$$

where the subscript "mod" indicates the modified antenna, and β represents cancellation efficiency, e.g., a β of 0.9 indicates a cancellation of 90% of a signal's power.

The target loads may be set based on the Rise over Thermal (RoT) for the base station 102, i.e., the ratio between the total power in the uplink and the thermal noise power in the uplink.

In one configuration, the relation of the RoT to the target load, $L_{tar}$, may be given by Equation (6):

$$L_{tar} = 1 - \frac{1}{RoT} \quad (6)$$

If pre-decoding soft IC is enabled on the uplink and the modified antenna target load, $L_{tar}$, is set to the same value as an IC-disabled system, coverage may be reduced. In other words, when an interfering user is cancelled, there may be a corresponding cancellation of some of the power of a useful signal. If a cell-edge user is already transmitting at maximum power, this drop in power of the useful signal from interference cancellation may cause the cell-edge user to be unable to close its connection loop, i.e., causing disconnection or degradation of quality. Therefore, the uplink scheduler 410 may determine a reduced target load for the modified antenna to avoid this impact.

For a non-IC user k, the SINR after cancelling the IC users may be given according to Equation (7):

$$SINR_k = \frac{\left(1 - \sum_{i \neq k} a_{k,i}\right)^2 E_{c,k}}{RTWP_{mod} - \left(1 - \sum_{i \neq k} a_{k,i}\right)^2 E_{c,k}} < \frac{E_{c,k}}{RTWP_{mod} - E_{c,k}} \quad (7)$$

where $RTWP_{mod}$ is the received total wideband power (total received power), $E_{c,k}$ is the chip level power of the $k^{th}$ user's signal and $a_{k,i}$ is given by Equation (8):

$$a_{k,i} = \frac{E(\hat{s}_i^* \cdot s_k)}{E(\hat{s}_k^* \cdot s_k)} \quad (8)$$

Because the cancellation of an interfering signal may unintentionally lower the useful signal power, the uplink scheduler may reduce a target load. Therefore, the correlation module 412 may determine a correlation factor ($\alpha$) 450. For the purposes of illustration and without limitation, assume a configuration with two users, where user 1 is the interfering user to be cancelled and user 2 is the useful signal. In this configuration, the reconstructed signal of user 1 may be a function of the original signal, s1, as well as the total interference seen by user 1, which is s2. Therefore, the correlation factor ($\alpha$) 450 between the reconstructed interfering signal due to user 1 and the useful signal due to user 2 may be defined according to Equation (9):

$$\alpha = \frac{E[\hat{s}_1(s_1, s_2)^* \cdot s_2]}{E(s_2^* \cdot s_2)} \quad (9)$$

where E( ) is the energy of a signal, $E(s_2^* \cdot s_2) = \sigma_2^2$ and $E(s_2) = 0$. Therefore, user 1's reconstructed signal only directly depends on the total interference rather than any single interference source. If s1 is then replaced with two equally strong users 3 and 4, then the correlation factor ($\alpha$) 450 may be given according to Equation (10):

$$\alpha = \frac{E[\hat{s}_1(s_1, s_3 + s_4)^* \cdot (s_3 + s_4)]}{E(s_3^* \cdot s_3) + E(s_4^* \cdot s_4)} \quad (10)$$

$$= \frac{E[\hat{s}_1(s_1, s_3 + s_4)^* \cdot s_3]}{2 \cdot E(s_3^* \cdot s_3)} + \frac{E[\hat{s}_1(s_1, s_3 + s_4)^* \cdot s_4]}{2 \cdot E(s_4^* \cdot s_4)}$$

where s3 is the signal from user 3, s4 is the signal from user 4, $$E(s_3^* \cdot s_3) = E(s_4^* \cdot s_4) = \frac{\sigma_2^2}{2}$$

and $E(s_3) = E(s_4) = 0$. Since user 3 and user 4 are symmetric, the correlation factor ($\alpha$) 450 may be given by Equation (11):

$$\alpha = \frac{E[\hat{s}_1(s_1, s_3 + s_4)^* \cdot s_3]}{2 \cdot E(s_3^* \cdot s_3)} = \frac{E[\hat{s}_1(s_1, s_3 + s_4)^* \cdot s_4]}{2 \cdot E(s_4^* \cdot s_4)} \quad (11)$$

Similarly, the case where user 2 is split into more components may be generalized. Therefore, no matter how much of the total interference (to user 1) that user 2 contributes, the correlation factor ($\alpha$) 450 may not change. More specifically, the correlation factor ($\alpha$) 450 may depend on the interfering user's Walsh structure and the channel types in the system, but not on the useful signal's power or Walsh structure. Therefore, the impact due to cancellation of a specific user may be the same for all other users, and may be evaluated when scheduling this specific user. In other words, the cancellation of an interfering signal may affect all other signals received at the base station 102 the same.

The correlation phenomenon may be confirmed by modeling an interfering user according to Table 1:

TABLE 1

| | Example of Interfering User | | |
|---|---|---|---|
| TBS | | T/P [dB] | E-DPDCH Spreading Factor |
| 510 | | 11 | [4 0 0 0] |
| 1015 | | 14 | [4 0 0 0] |
| 2020 | | 17 | [4 4 0 0] |
| 3119 | | 18 | [2 2 0 0] | where TBS is the transport block size 444 of the interfering user, T/P is the traffic to pilot power ratio, and E-DPDCH Spreading Factor is spreading factor used on the Enhanced Dedicated Physical Data Channel for the interfering user's packets. On the uplink, a user may be allowed four Walsh codes, so [4 0 0 0] indicates that the interfering user may be using a first Walsh code channel using spreading factor 4 and not transmitting on the second through fourth Walsh code channels.

A useful signal (user 2 signal in the above example) may be modeled according to Table 2:

TABLE 2

Example of Useful Signal

| TBS | T/P [dB] | E-DPDCH Spreading Factor | $E_{cp}/N_t$ target [dB] |
|---|---|---|---|
| 1015 | 14 | [4 0 0 0] | −18.5 |
| 307 | 8 | [4 0 0 0] | −20.5 |
| 120 | 6 | [1 6 0 0 0] | −20.5 | where $E_{cp}$ is the chip level pilot power and $N_t$ is the chip level total noise power of the user.

To reduce the coverage impact of this correlation, the correlation module 412 may adjust the target load, i.e., reduce the target load from what might be used without taking into account the correlation phenomenon. For the purpose of illustration, assume a cell-edge user (user 2) needs a certain SNR, $\gamma$, to close its link (i.e., maintain communication quality) in a non-IC system. This SNR, $\gamma$, is given by Equation (12):

$$\frac{E_c}{I_0 - E_c} = \gamma \quad (12)$$

where $E_c$ is the received pilot energy and $I_0$ is the total received energy 452 at the base station 102. If the user wants to maintain the same SNR (to keep the same connection quality) after cancelling another interfering user in a pre-decoding soft IC system, the SNR calculation may use a reduced target energy ($I_0'$) 462 in the SNR calculation according to Equation (13):

$$\frac{(1-\alpha_{21})^2 \cdot E_c}{I_0' - (1-\alpha_{21})^2 \cdot E_c} = \gamma \quad (13)$$

where $\alpha_{21}$ is the correlation factor 450 between the reconstructed interfering signal (user 1) and the useful signal (user 2). In other words, $E_c$ from Equation (12) may be scaled by $(1-\alpha_{21})^2$ when the reduced target energy ($I_0'$) 462 is used if the same SNR, $\gamma$, is produced. Therefore, the reduced target energy ($I_0'$) 462 may be given by Equation (14):

$$I_0' = (1-\alpha_{21})^2 \cdot I_0 \quad (14)$$

A back-off calculator 454 in the correlation module 412 may use the total received energy ($I_0$) 452 to determine a reduced target energy ($I_0'$) 462 according to Equation (14), i.e., taking into account the correlation phenomenon. In one configuration, a correlation factor calculator 446 may use a correlation factor table 448 to determine correlation factors ($\alpha$) 450 for possible packet sizes, e.g., transport block sizes (TBSs) 444. The correlation factor table 448 may be created off-line and stored in memory. Table 3 illustrates one possible configuration of a correlation factor table 448:

TABLE 3

Example of Correlation Factor Table

| TBS of Interfering User | Correlation Factor ($\alpha$) | | | | Maximal Correlation Factor |
|---|---|---|---|---|---|
| | PedestrianA 3 | PedestrianB 3 | VehicleA30 | VehicleA120 | |
| 510 | 0.023 | 0.026 | 0.023 | 0.02 | 0.026 |
| 1015 | 0.026 | 0.028 | 0.021 | 0.019 | 0.028 |
| 2020 | 0.051 | 0.057 | 0.044 | 0.04 | 0.057 |
| 3119 | 0.114 | 0.128 | 0.109 | 0.095 | 0.128 |

Since the correlation factor ($\alpha$) 450 depends on channel type, the correlation factor table 448 may include the maximal correlation factor ($\alpha_m$) 451 for a plurality of common channel types and specific transport block sizes (TBSs) 444. In other words, the maximal correlation factor ($\alpha_m$) 451 may be the correlation factor ($\alpha$) 450 for the worst case channel type because the channel type may not be known to the base station 102. For example, the correlation factor ($\alpha$) 450 for an interfering signal with a TBS 444 of 510 with a channel characterized by pedestrian A walking at 3 km/hr may be 0.023, pedestrian B walking at 3 km/hr may be 0.026, vehicle A moving at 30 km/hr may be 0.023, and vehicle A moving at 120 km/hr may be 0.02. Therefore, the maximal correlation factor ($\alpha_m$) 451 for an interfering signal with a TBS of 510 may be 0.026, i.e., the correlation factor ($\alpha$) 450 used for a TBS of 510 may be for the worst case channel type: 0.026. Similar entries may be made in the correlation factor table 448 for different TBS 444 values, e.g., 1015, 2020, 3119, etc. The back-off calculator 454 may then use the maximal correlation factor ($\alpha_m$) 451 (i.e., the worst case scenario) to determine a reduced target energy ($I_0'$) 462 when scheduling an interfering user. In one configuration, the correlation factor table 448 may include only the TBS 444 and correlation factor ($\alpha$) 450 data.

The reduced target energy ($I_0'$) 462 may be used to determine a reduced target Rise over Thermal (RoT) 465, i.e., using a Rise over Thermal (RoT) calculator 463. The reduced target RoT 465 may be used to determine a reduced target load 467, i.e., according to Equation (6). A scheduling module 464 may use the reduced target load 467 to determine uplink power 468 for various user equipment (UE) grants 466, i.e., the allocated uplink power 468 for the UEs.

Alternatively, instead, of using a correlation factor table 448 in the correlation module 412, the uplink scheduler 410 may use a dynamic back-off module 414 to dynamically determine a reduced target RoT 465 based on cell-edge user's block error rate (BLER) 460. This dynamic method may not use explicit correlation factors (α) 450. Rather, a UE 104 may be configured to report scheduling information 416 that includes power headroom information 456 to the Node B 102, e.g., over an Enhanced Dedicated Channel (E-DCH). From this data, the dynamic back-off module 414 may identify a UE 104 that is headroom limited based on the data, i.e., UEs 104 with little or no available headroom are likely to be near a geographical cell edge. Once a headroom-limited user is identified, the dynamic back-off module 414 may adjust the target load (e.g., determine a new reduced target RoT 465) of the cell to achieve a target block error rate (BLER) 460 for the UE. For example, the dynamic back-off module 414 may use cyclic redundancy check (CRC) results 458 to determine if uplink data from the user is correctly decoded. If data from the cell edge user is decoded successfully, the reduced target RoT 465 may be increased. Conversely, if data from the cell edge user is not decoded successfully, the reduced target RoT 465 may be decreased.

Figure 5:
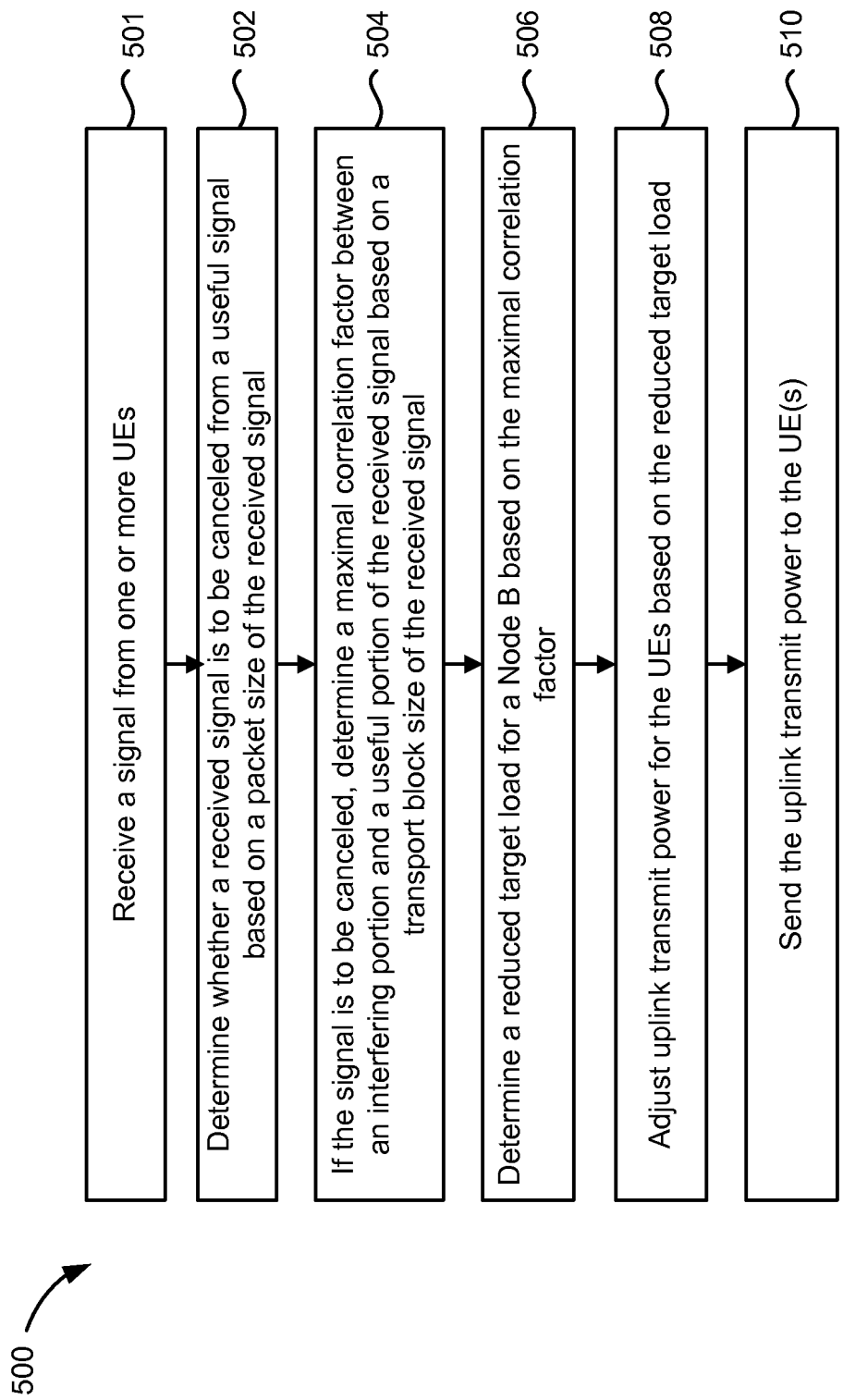
FIG. 5 is a flow diagram illustrating a method for load control using a maximal correlation factor ($\alpha_m$)

FIG. 5 is a flow diagram illustrating a method 500 for load control using a maximal correlation factor ($\alpha_m$) 451. The method 500 may be implemented by an uplink scheduler 410 in a Node B 102, e.g., a correlation module 412. The uplink scheduler 410 may receive 501a signal from one or more user equipments (UEs) 104. Whenever a user is scheduled, the uplink scheduler 410 may determine 502 if interference is to be cancelled from the received signal or not based on a grant, i.e., determine 502 whether interference is to be cancelled from the received signal based on a packet size (e.g., TBS 444) of the received signal. For example, larger packet sizes may be likely to cause interference and may be cancelled, while smaller packet sizes may be less likely to cause interference and may not be cancelled. If the packet is to be cancelled, the uplink scheduler 410 may determine 504 a maximal correlation factor ($\alpha_m$) 451 between an interfering portion and a useful portion of the received signal based on a transport block size (TBS) 444 of the received signal.

In one configuration, the maximal correlation factor ($\alpha_m$) 451 for a particular TBS 444 may represent the worst case scenario across multiple common channel types, i.e., cancellation of the interfering signal causes a large drop in the power of the useful signal as seen at the Node B 102. The uplink scheduler 410 may also determine 506 a reduced target load 467 for a Node B 102 based on the maximal correlation factor ($\alpha_m$) 451, e.g., the uplink scheduler 410 may determine a reduced target energy ($I_0'$) 462 based on the maximal correlation factor ($\alpha_m$) 451, determine a reduced target RoT 465 based on the reduced target energy ($I_0'$) 462 and determine a reduced target load 467 based on the reduced target RoT 465.

The RoT may have a 1:1 correspondence with the target load, e.g., according to Equation (6). The uplink scheduler 410 may then adjust 508 uplink transmit power 468 for one or more user equipments (UEs) based on the reduced target load 467. Furthermore, the Node B 102 may send 510 the uplink transmit power 468 to the UE(s) 104.

Since the correlation factors (α) 450 may depend on the channel type of the user, which is unknown to the Node B 102, the maximal correlation factor ($\alpha_m$) 451 may have some error if the channel type does not match, i.e., the back-off error. The back-off error may be given by Table 4:

TABLE 4

| TBS of Interfering User | Back-Off Error | | | | Maximal Correlation Factor |
|---|---|---|---|---|---|
| | Back-Off Error [dB] | | | | |
| | PedestrianA 3 | PedestrianB 3 | VehicleA30 | VehicleA120 | |
| 510 | −0.027 | 0 | −0.027 | −0.053 | 0.026 |
| 1015 | −0.018 | 0 | −0.062 | −0.08 | 0.028 |
| 2020 | −0.055 | 0 | −0.119 | −0.155 | 0.057 |
| 3119 | −0.138 | 0 | −0.187 | −0.323 | 0.128 |

In other words, the back-off error is the error when the actual channel type is not the worst case channel. For example, the back-off error for a packet size (TBS) 444 of 510 may be 5.3 percent for vehicle A traveling at 120 km/hr because the maximal correlation factor ($\alpha_m$) 451 used is for pedestrian B moving at 3 km/hr. The error (Err) may be defined by Equation (15):

$$Err = 10 \cdot \log_{10}\left(\frac{I_0''}{I_0'}\right) \qquad (15)$$

where $I_0'$ 462 and $I_0''$ are defined by Equations (16) and (17):

$$I_0' = (1-\alpha_{21})^2 \cdot I_0 \qquad (16)$$

$$I_0'' = (1-\hat{\alpha}_{21})^2 \cdot I_0 \qquad (17)$$

where $\alpha_{21}$ is the maximal correlation factor 451 between user 1 and user 2.

Figure 6:
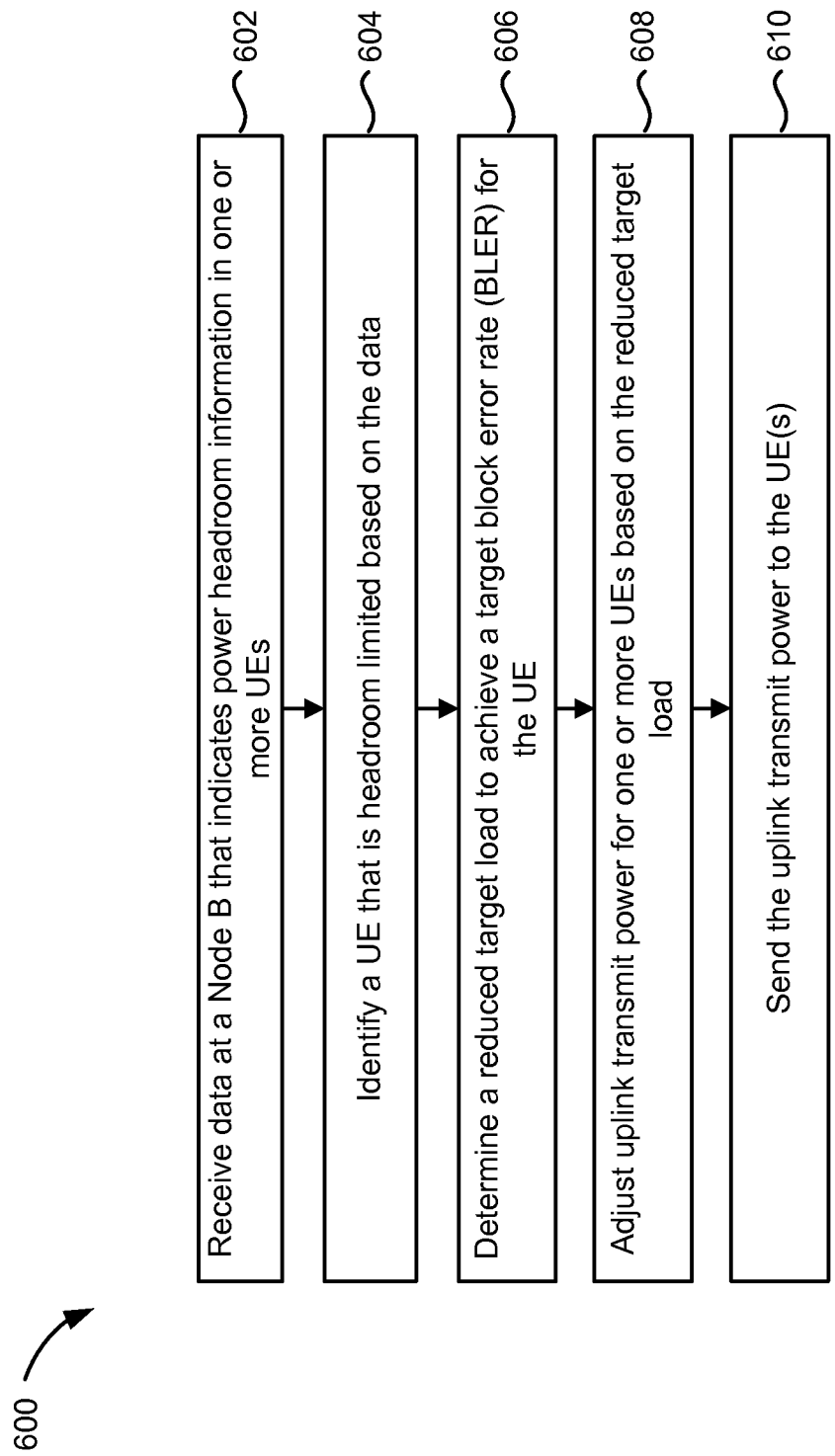
FIG. 6 is a flow diagram of a method for load control using a dynamic algorithm.

FIG. 6 is a flow diagram of a method 600 for load control using a dynamic algorithm. The method 600 may be performed by an uplink scheduler 410 in a Node B 102, e.g., a dynamic back-off module 414. The method 600 may be performed as an alternative to, or in addition to, the method 500 illustrated in FIG. 5. The uplink scheduler 410 may receive 602 data at a Node B 102 that indicates power headroom information 456 in one or more UEs 104, i.e., data that indicates how close a UE 104 is to its maximum transmit power. For example, a UE 104 may be configured to report scheduling information (SI) 416 that includes power headroom information 456 to the Node B 102, e.g., over an Enhanced Dedicated Channel (E-DCH). Alternatively, or in addition, if a user's outer loop power control drives the user's signal-to-interference ratio (SIR) target to an upper limit, this may indicate that the user is cell-edge limited. The uplink scheduler 410 may also identify 604 a UE 104 that is headroom limited based on the data, i.e., UEs 104 with little or no available headroom are likely to be near a geographical cell edge. Once a headroom-limited user is identified, the uplink scheduler 410 may determine 606 a reduced target load 467 of the cell to achieve a target block error rate (BLER) 460 for the UE 104. For example, the uplink scheduler 410 may determine 606 a reduced target load 467 from a reduced target RoT 465. The reduced target RoT 465 may be decreased if a packet from a cell-edge user is not decoded successfully. Conversely, the reduced target RoT 465 may be increased if a packet from a cell-edge user is decoded successfully. The RoT may have a 1:1 correspondence with the target load, i.e., according to Equation (6). The uplink scheduler 410 may then adjust 608 uplink transmit power 468 for one or more user equipments (UEs) 104 based on the reduced target load 467. Furthermore, the Node B 102 may send 610 the uplink transmit power 468 to the UE(s) 104. This method 600 may be repeated with each scheduling event, thus serving as a dynamic load control, i.e., the Node B 102 may continue to receive headroom information 456 and BLERs 460 for the UEs 104 and continue to determine new reduced target loads 467 for them.

The method 600 may not depend on packet sizes of the users being cancelled, or channel type. Therefore, it may be more generic than the method 500 illustrated in FIG. 5. However, the method 600 may depend on the existence of a cell-edge user, and on the scheduler's ability to correctly identify the cell-edge user. In one configuration, the method 600 may only be performed for signals that are going to have interference cancelled from them.

Figure 7:
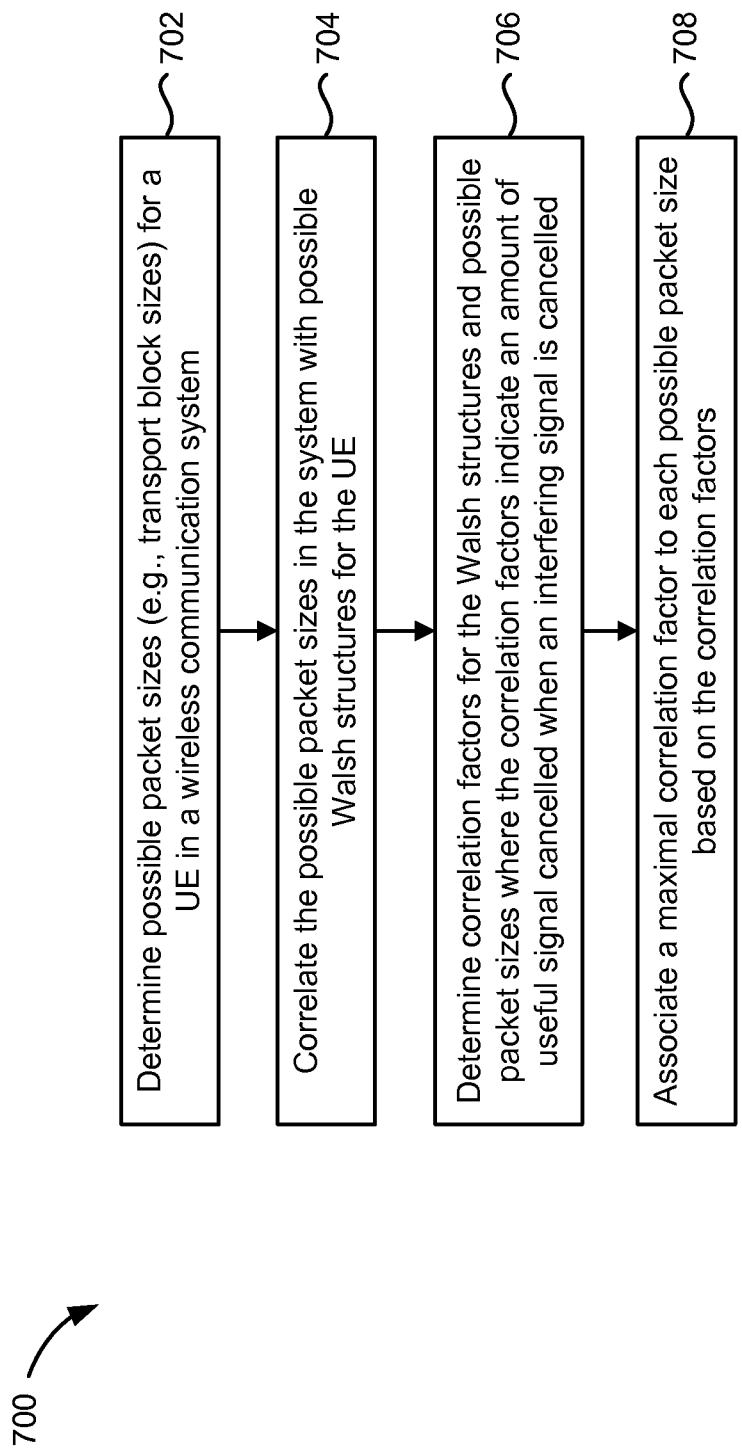
FIG. 7 is a flow diagram illustrating a method of determining a correlation factor table.

FIG. 7 is a flow diagram illustrating a method 700 of determining a correlation factor table 448. The method 700 may be implemented offline by a computing device (e.g., a personal computer running simulations, a Node B 102, etc.) and the correlation factor table 448 may be stored in memory on a Node B 102. The computing device may determine 702 possible packet sizes for a UE 104 in a wireless communication system 100. For example, the possible packet sizes may be the possible transport block sizes (TBSs) 444 for uplink data in the wireless communication system 100, e.g., 510, 1015, 2020, 3119, etc. The possible packet sizes may depend on the wireless system 100 in which the Node B 102 will operate. The computing device may also correlate 704 the possible packet sizes in the wireless communication system 100 with possible Walsh structures for the UE 104, e.g., as illustrated in Table 1 and Table 2. In one configuration, a UE 104 may be allowed four Walsh codes, so [4 0 0 0] indicates that the UE 104 may be using a first Walsh code channel using spreading factor 4 and not transmitting on the second through fourth Walsh code channels. The computing device may also determine 706 correlation factors ($\alpha$) 450 for the Walsh structures and possible packet sizes where the correlation factors ($\alpha$) 450 indicate an amount of useful signal cancelled when an interfering signal is cancelled. The computing device may also associate 708 a maximal correlation factor ($\alpha_m$) 451 to each possible packet size based on the correlation factors ($\alpha$) 450. The maximal correlation factor ($\alpha_m$) 451 may represent the correlation factor ($\alpha$) 450 associated with a particular TBS 444 (the TBS 444 is correlated with the Walsh structures) and the worst possible channel type. Therefore, the maximal correlation factor ($\alpha_m$) 451 for a UE 104 may be chosen based on the TBS 444 of the UE 104. An example of the correlation factor table 448 may be Table 3, with or without the channel type entries.

Figure 8:
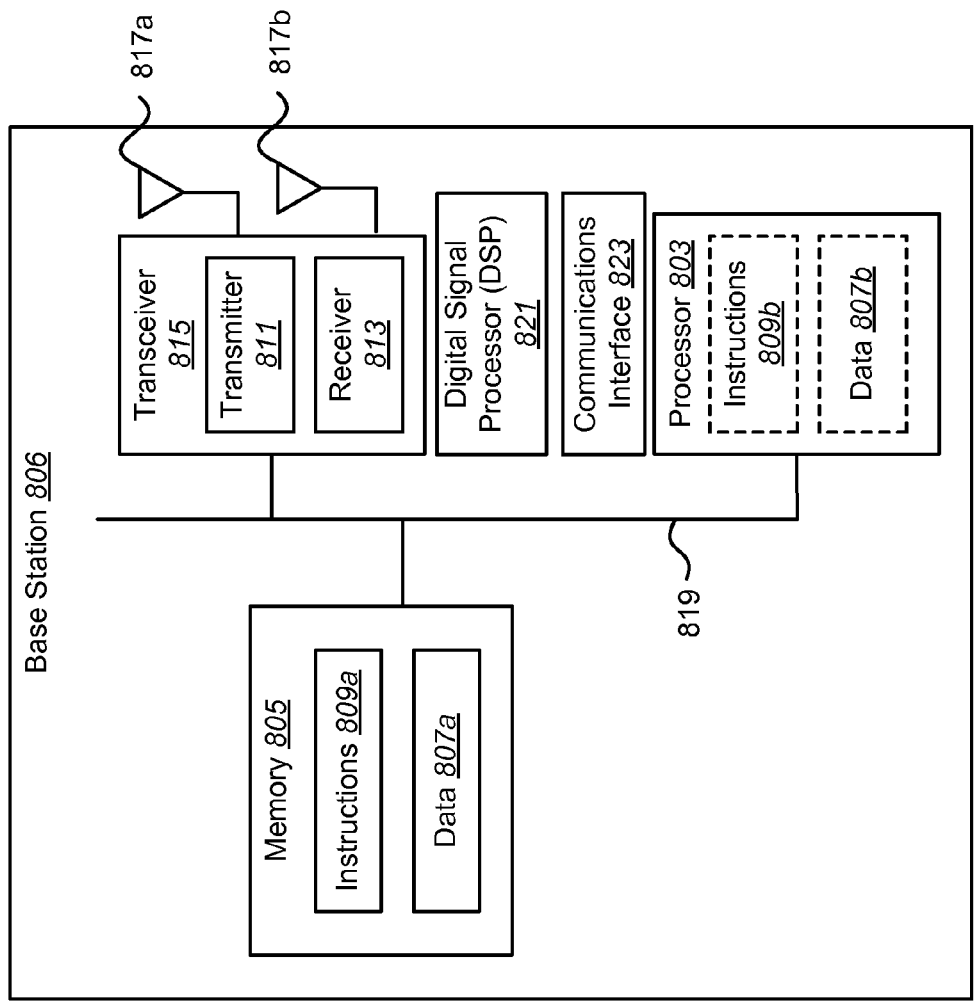
FIG. 8 illustrates certain components that may be included within a base station.

FIG. 8 illustrates certain components that may be included within a base station 806. A base station 806 may also be referred to as, and may include some or all of the functionality of, an access point, a broadcast transmitter, a node B, an evolved node B, etc. For example, the base station 806 may be the base station 102 illustrated in FIG. 1. The base station 806 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the base station 806 of FIG. 8, in an alternative configuration, a combination of processors (e.g., an ARM and DSP) could be used.

The base station 806 also includes memory 805. The memory 805 may be any electronic component capable of storing electronic information. The memory 805 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The base station 806 may also include a transmitter 811 and a receiver 813 to allow transmission and reception of signals to and from the base station 806. The transmitter 811 and receiver 813 may be collectively referred to as a transceiver 815. Multiple antennas 817a-b may be electrically coupled to the transceiver 815. The base station 806 may also include (not shown) multiple transmitters, multiple receivers, multiple transceivers and/or additional antennas.

The base station 806 may include a digital signal processor (DSP) 821. The base station 806 may also include a communications interface 823. The communications interface 823 may allow a user to interact with the base station 806.

The various components of the base station 806 may be coupled together by one or more buses, which may include a power bus, a control signal bus, a status signal bus, a data bus, etc. For the sake of clarity, the various buses are illustrated in FIG. 8 as a bus system 819.

Figure 9:
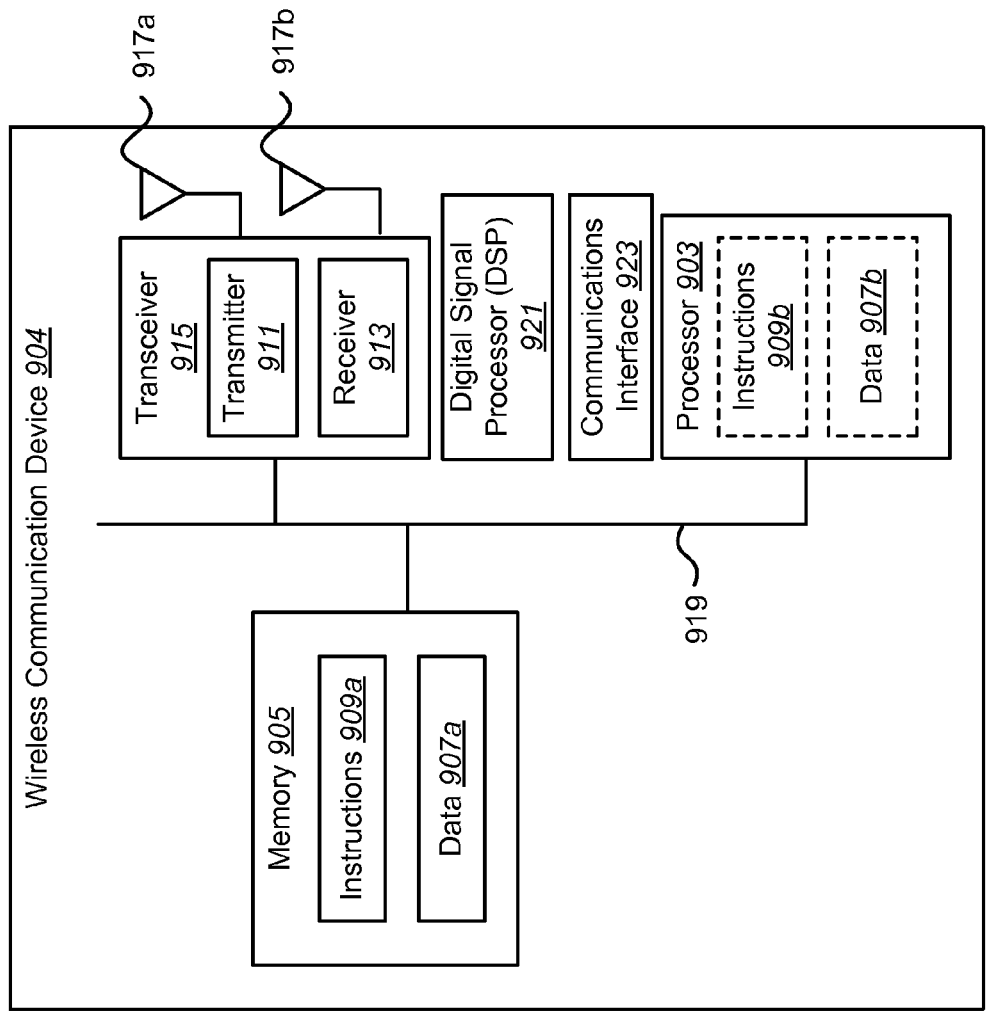
FIG. 9 illustrates certain components that may be included within a wireless communication device.

FIG. 9 illustrates certain components that may be included within a wireless communication device 904. The wireless communication device 904 may be an access terminal, a mobile station, a user equipment (UE), etc. For example, the wireless communication device 904 may be the wireless communication device 104 illustrated in FIG. 1. The wireless communication device 904 includes a processor 903. The processor 903 may be a general purpose single- or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless communication device 904 of FIG. 9, in an alternative configuration, a combination of processors (e.g., an ARM and DSP) could be used.

The wireless communication device 904 also includes memory 905. The memory 905 may be any electronic component capable of storing electronic information. The memory 905 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 907a and instructions 909a may be stored in the memory 905. The instructions 909a may be executable by the processor 903 to implement the methods disclosed herein. Executing the instructions 909a may involve the use of the data 907a that is stored in the memory 905. When the processor 903 executes the instructions 909a, various portions of the instructions 909b may be loaded onto the processor 903, and various pieces of data 907b may be loaded onto the processor 903.

The wireless communication device 904 may also include a transmitter 911 and a receiver 913 to allow transmission and reception of signals to and from the wireless communication device 904. The transmitter 911 and receiver 913 may be collectively referred to as a transceiver 915. Multiple antennas 917a-b may be electrically coupled to the transceiver 915. The wireless communication device 904 may also include (not shown) multiple transmitters, multiple receivers, multiple transceivers and/or additional antennas.

The wireless communication device 904 may include a digital signal processor (DSP) 921. The wireless communication device 904 may also include a communications interface 923. The communications interface 923 may allow a user to interact with the wireless communication device 904.

The various components of the wireless communication device 904 may be coupled together by one or more buses, which may include a power bus, a control signal bus, a status signal bus, a data bus, etc. For the sake of clarity, the various buses are illustrated in FIG. 9 as a bus system 919.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5-7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for load control in uplink interference cancellation systems with soft decision, comprising:
   determining whether interference is to be cancelled from a received signal based on a packet size of the received signal, and
   if the signal is to be cancelled:
      determining a maximal correlation factor between an interfering portion and a useful portion of the received signal based on a transport block size of the received signal;
      determining a reduced target load for a base station based on the maximal correlation factor; and
      adjusting uplink transmit power for one or more wireless communication devices based on the reduced target load.

2. The method of claim 1, wherein the maximal correlation factor is a highest correlation factor determined for the transport block size and a plurality of channel types.

3. The method of claim 2, wherein the maximal correlation factor depends on a Walsh structure of an interfering wireless communication device and not a Walsh structure of non-interfering wireless communication devices.

4. The method of claim 1, wherein the determining a maximal correlation factor comprises using a table that is calculated before the method is performed.

5. The method of claim 1, wherein the determining the reduced target load comprises:
   determining a reduced target energy for the base station based on the maximal correlation factor;
   determining a reduced target Rise over Thermal (RoT) based on the reduced target energy; and
   determining a reduced target load based on the reduced target RoT.

6. The method of claim 5, wherein the determining a reduced target energy comprises multiplying a total received energy (I0) by $(1-\alpha)2$, where $\alpha$ is the maximal correlation factor.

7. The method of claim 1, further comprising sending the uplink transmit power to the wireless communication devices.

8. The method of claim 1, wherein the method is performed by a Node B.

9. A base station for load control in uplink interference cancellation systems with soft decision, comprising:
   a processor;
   memory in electronic communication with the processor;
   instructions stored in the memory, the instructions being executable by the processor to:
      determine whether interference is to be cancelled from a received signal based on a packet size of the received signal, and
      if the signal is to be cancelled:
         determine a maximal correlation factor between an interfering portion and a useful portion of the received signal based on a transport block size of the received signal;
         determine a reduced target load for the base station based on the maximal correlation factor; and
         adjust uplink transmit power for one or more wireless communication devices based on the reduced target load.

10. The base station of claim 9, wherein the maximal correlation factor is a highest correlation factor determined for the transport block size and a plurality of channel types.

11. The base station of claim 10, wherein maximal correlation factor depends on a Walsh structure of an interfering wireless communication device and not a Walsh structure of non-interfering wireless communication devices.

12. The base station of claim 9, wherein the instructions executable to determine a maximal correlation factor comprise instructions executable to use a table that is calculated offline.

13. The base station of claim 9, wherein the instructions executable to determine a reduced target load comprise instructions executable to:
   determine a reduced target energy for the base station based on the maximal correlation factor;
   determine a reduced target Rise over Thermal (RoT) based on the reduced target energy; and
   determine a reduced target load based on the reduced target RoT.

14. The base station of claim 13, wherein the instructions executable to determine the reduced target energy comprise instructions executable to multiply a total received energy (I0) by $(1-\alpha)2$, where $\alpha$ is the maximal correlation factor.

15. A base station for load control in uplink interference cancellation systems with soft decision, comprising:
   means for determining whether interference is to be cancelled from a received signal based on a packet size of the received signal;
   means for determining, if the signal is to be cancelled, a maximal correlation factor between an interfering portion and a useful portion of the received signal based on a transport block size of the received signal;
   means for determining, if the signal is to be cancelled, a reduced target load for the base station based on the maximal correlation factor; and
   means for adjusting, if the signal is to be cancelled, uplink transmit power for one or more wireless communication devices based on the reduced target load.

* * * * *